2,959,186
VALVE

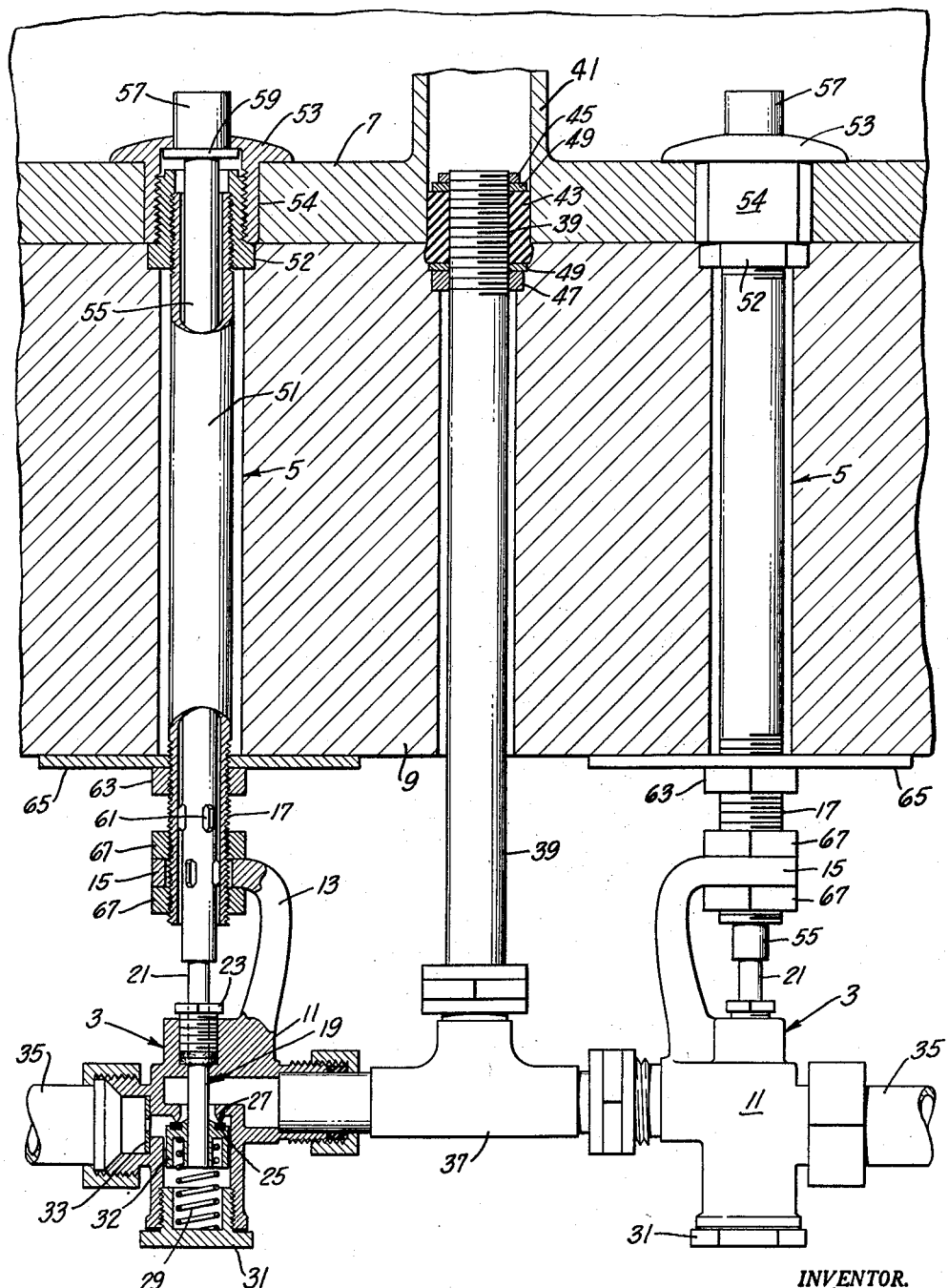

William F. McClenahan, 1485 Bayshore Blvd.,
San Francisco, Calif.

Filed Mar. 29, 1956, Ser. No. 574,701

1 Claim. (Cl. 137—360)

This invention relates to a valve and more particularly relates to a water valve which is operated by means of a push rod. The valve of the present invention is primarily designed for use in institutions such as prisons and the like wherein it is desired to have a completely tamper-proof assembly. However, it is obvious that the valve of the present invention can be used in many diverse applications.

In institutions and the like, it is highly desirable to have a valve which can be serviced from the back of a wall, and which will not offer any parts which can be dissembled or otherwise abused by the user.

According to the present invention, a valve is provided wherein the only exposed portion is a push button and a surrounding flange and wherein the flange is provided with a square shank which cannot be twisted. The push button itself is free to rotate and can be rotated by the user without any deleterious effect on the plumbing. Further, the valve can be regulated or serviced from the rear so that it is not necessary to enter the cell wherein the valve is used.

In the drawing forming a part of this application:

The figure is a plan view of two valves of the present invention installed on a basin. One of the valves has been partially cut away to show the internal structure.

Although the drawing illustrates a pair of valves and they would normally be used in this manner, it is obvious that the valves may be used singly, as in an institution where only cold water is provided.

Turning now to a specific description of the drawing by reference characters, the valve body proper has been generally designated 3 and the valve actuating structure has been generally designated 5. As can be seen, the valve is shown mounted on a basin 7, which in turn is mounted on a wall 9.

The valve consists of a housing 11 having a curved arm 13 extending therefrom and terminating in a loop 15 through which a pipe 17 may be passed. The valve has a plunger member, generally designated 19. The plunger 19 has a valve stem 21, which passes through a packing nut 23 and has attached thereto a washer 25, which normally abuts against a valve seat 27, which is formed as a part of the valve body. The valve is maintained in a normally closed position by means of the spring 29, which is retained between the cap nut 31 and a cup 32 on the valve stem. The valve may be further provided with an orifice 33, so that the valve can be preset to give any desired rate of flow. The valve is attached to conventional water inlet lines 35 by means well-known to those skilled in the art.

The outlets of the two valves illustrated go to a common mixing T 37, whereupon the water is carried through pipe 39 to a faucet or the like 41. The pipe 39 is equipped with an expandable rubber sleeve 43, two lock nuts 45 and 47, and two washers 49. Thus, in the particular application illustrated, the pipe 39 can be inserted in the fixture 7 and will make a water-tight connection with the integrally cast faucet 41 merely by tightening the lock nut 47. Thus, no exposed fittings are required.

Returning now to the valve proper, a tube 51 is provided which is threaded at both ends; one end of tube 51 is threaded to a bushing 52. The bushing 52 is threaded to the flange 53, which has a square shoulder 54 thereon, which passes through a square opening in the basin wall 7. Passing through the tube 51 is a rod 55, one end of which is in contact with the valve stem 21, and the other end of which is equipped with a push button 57. The button 57 has a shoulder 59 thereon so that it cannot be withdrawn through the flange 53. The rod 55 may have a series of projections 61 thereon to hold it concentric with the tube 51.

In installing the device, the tube 51 with the bushing 52 and flange 53 attached thereto and the rod 55 assembled therein is passed through the basin 7 from the front and through the wall 9 and is locked in place with the nut 63. If desired, a small steel plate 65 can be used to distibute the pressure over an appreciable area of the wall 9. The loop 15 is passed over the pipe 51 and is held in place by means of the two nuts 67, which serve to orient the valve structure relative to the push rod. It is obvious that by adjusting the two nuts 67, the relationship of the valve stem 21 to the tube 51 can be changed, which in turn will determine the possible degree of opening of the valve. Thus, an inmate may be allowed to use more or less water, depending on the relative adjustment of the two nuts 67.

The valve of the present invention can be readily serviced from the rear, since it is only necessary to remove the cap nut 31 to withdraw the valve stem assembly 19, so that the washer 25 can be easily replaced.

It is believed obvious from the foregoing that I have provided a valve, suitable for use in institutions and the like, which is absolutely tamperproof from the front and wherein all necessary servicing of the valve can be accomplished from the rear.

I claim:

A valve in combination with a wall and structure to mount said valve relative to said wall comprising a manually operated valve mounted on the back side of wall and having an operating button for actuating the valve on the front side of said wall, a hollow tube secured in a passage extending through the wall with the back side thereof having threads on at least the portion extending beyond the wall, a rod extending through said tube and terminating in a push button on the front side of said wall, said push button having only a limited movement, a valve body having a loop thereon slidably mounted over the threaded back end of said tube, nuts threaded on said tube on each side of said loop whereby the position of said valve body relative to the wall can be altered, a flow passage through said valve body having a valve seat, a reciprocating valve element co-acting with said seat, a stem on said valve element extending from said valve body into contact with said rod, whereby pressure on the push button actuates said valve element, and whereby the maximum flow through said valve can be controlled by adjusting the position of the valve body relative to the tube extending through the wall.

References Cited in the file of this patent

UNITED STATES PATENTS

| | | |
|---|---|---|
| 844,828 | Oehlke | Feb. 19, 1907 |
| 866,642 | Gillin | Sept. 24, 1907 |
| 968,711 | Stevenson | Aug. 30, 1910 |
| 1,548,570 | Wuesthoff | Aug. 4, 1925 |
| 1,627,830 | Buckley | May 10, 1927 |
| 1,806,462 | Hopkins | May 19, 1931 |
| 2,736,528 | Brock | Feb. 28, 1956 |

FOREIGN PATENTS

| | | |
|---|---|---|
| 725,464 | Germany | of 1942 |